United States Patent
Mao et al.

(10) Patent No.: US 11,600,812 B2
(45) Date of Patent: Mar. 7, 2023

(54) ELECTRODE PARTICLES SUITABLE FOR BATTERIES

(71) Applicant: PHILLIPS 66 COMPANY, Houston, TX (US)

(72) Inventors: Zhenhua Mao, Bartlesville, OK (US); Nan Li, Owasso, OK (US); Corey W. Tropf, Bartlesville, OK (US); Dachuan Shi, Bartlesville, OK (US); Christopher J. LaFrancois, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 250 days.

(21) Appl. No.: 16/929,222

(22) Filed: Jul. 15, 2020

(65) Prior Publication Data
US 2021/0020903 A1      Jan. 21, 2021

Related U.S. Application Data

(60) Provisional application No. 62/875,318, filed on Jul. 17, 2019, provisional application No. 62/875,299, filed on Jul. 17, 2019, provisional application No. 62/875,315, filed on Jul. 17, 2019.

(51) Int. Cl.
| | | |
|---|---|---|
| *H01M 4/1393* | (2010.01) | |
| *H01M 10/0525* | (2010.01) | |
| *H01M 4/583* | (2010.01) | |
| *C04B 35/628* | (2006.01) | |
| *H01M 4/133* | (2010.01) | |
| *H01M 4/02* | (2006.01) | |

(52) U.S. Cl.
CPC ..... *H01M 4/1393* (2013.01); *C04B 35/62839* (2013.01); *H01M 4/133* (2013.01); *H01M 4/583* (2013.01); *H01M 10/0525* (2013.01); *H01M 2004/021* (2013.01); *H01M 2004/027* (2013.01)

(58) Field of Classification Search
None
See application file for complete search history.

(56) References Cited

U.S. PATENT DOCUMENTS

2009/0289219 A1* 11/2009 Chang ................. H01M 4/0416
427/113
2014/0205905 A1* 7/2014 Xiao ..................... H01M 4/049
429/231.5

\* cited by examiner

*Primary Examiner* — Wyatt P McConnell
(74) *Attorney, Agent, or Firm* — Phillips 66 Company

(57) ABSTRACT

The disclosure relates to a carbon-based electrode material that has been graphitized to hold ions in the electrode of a battery and more particularly include carbide or carbide and nitride surfaces that protect the graphite core. The preferred batteries include metal ion such as lithium ion batteries where the carbon-based electrode is the anode although the carbon-based electrode may also serve in dual ion batteries where both electrodes may comprise the graphitized carbon-based electrodes. The electrodes are more amorphous than conventional graphite electrodes and include a carbide or nitride containing surface treatment.

13 Claims, 1 Drawing Sheet

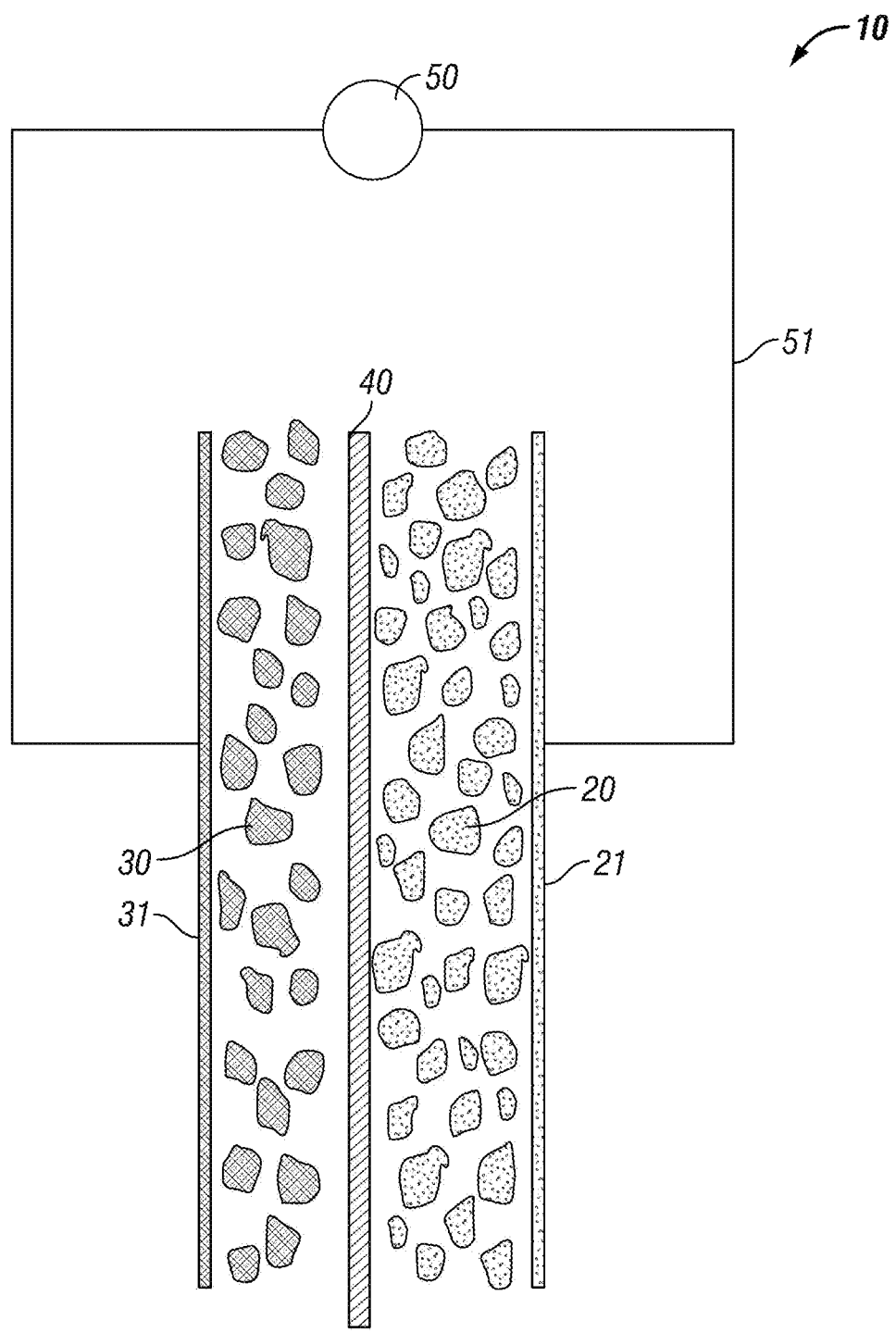

ELECTRODE PARTICLES SUITABLE FOR BATTERIES

CROSS-REFERENCE TO RELATED APPLICATIONS

This application is a non-provisional application which claims benefit under 35 USC § 119(e) to U.S. Provisional Application Ser. Nos. 62/875,299, 62/875,315 and 62/875,318, all filed on Jul. 17, 2019 and each entitled "ELECTRODE PARTICLES SUITABLE FOR BATTERIES," which are all incorporated herein in their entirety.

STATEMENT REGARDING FEDERALLY SPONSORED RESEARCH OR DEVELOPMENT

None.

FIELD OF THE INVENTION

This invention relates to batteries and particularly to materials useful for making the anode for batteries and more particularly useful for the anode in metal ion batteries.

BACKGROUND OF THE INVENTION

Rechargeable lithium-ion batteries have been extensively adopted in many portable systems and devices such as cell phones, tablets, computers, handheld portable tools and new devices that are being developed relying on the power and weight advantages of lithium ion batteries. The advantages are light weight, high voltage, high electrochemical equivalence and good conductivity. The broad uses and acceptance of lithium ion batteries has come through many advances and developments. One area of development for lithium-ion batteries has been focused on the anode or negative electrode of lithium-ion batteries where much has been accomplished.

The key considerations for anodes for lithium ion batteries, especially for portable devices is high volume and weight specific capacity and long battery life over many multiple charge and discharge cycles. In prior work, anode materials were produced with initial coulombic efficiency approaching 95% with long life through coated and graphitized carbon precursor materials. This is described in U.S. Pat. No. 7,323,120 to Mao et al. where petroleum coke is ground to a preferred size, subjected to a solvent coating process, having the coating oxidatively stabilized at an elevated temperature and then the whole particle carbonized and graphitized at even higher temperature in an inert environment. The particles formed highly graphitic structures with a protective coating on the surface that protected the underlying graphite sheets from the electrolyte of the battery. The protective coating protects the edges of graphite sheets which are believed to be catalytically active for the electrolytes in batteries. The electrolytes thereby decompose the graphite sheets during the charging cycle and thereby quickly and drastically reduce the efficiency and storage capacity for lithium ions in the anode. The coating created on anode particles comprised a layer of poorly graphitizable material that when graphitized with the rest of the particle formed a more stable graphite with respect to catalytic decomposition from the electrolyte, but not suitable for itself intercalating lithium ions. But lithium ions are able to easily pass through the coating and intercalate into the more organized graphite sheets. Indeed, this is very good material with good properties and good cycle life. However, its production requires the use of substantial volumes of solvent along with multiple successive separate heat treatments in different atmospheres, all of which add up to be expensive. But, for high value uses where high specific capacity is needed in a compact space and minimal weight are important, this anode is currently most advantageous.

The most important parameters of graphite negative electrode materials for lithium-ion batteries are the initial coulombic efficiency and specific capacity. It has been well known that highly crystalline graphite powders have high specific capacity and very poor initial coulombic efficiency and are not usable as negative electrode material for lithium-ion batteries. Through many years of extensive research and development, sophisticated processes have been developed to mitigate the problems related to specific capacity and the initial coulombic efficiency; the major solutions concentrate on high temperature graphitization and coating the particles with poorly graphitizable carbon before graphitization to provide protection from the electrolyte for the underlying graphite sheets in the particles. Because the mean average particle size of graphite negative electrode materials is smaller than 30 microns and individual particles must be uniformly coated with poorly graphitizable carbon, graphite negative electrode materials are currently manufactured through complicated processing steps. As a result, the production cost is high and for some coating processes, product yield is low.

With all materials, higher performance at lower cost are continuous drivers and any progress in either performance or cost would be very desirable.

BRIEF SUMMARY OF THE DISCLOSURE

The invention relates to a lithium-ion battery comprising a cathode, an anode, and an electrolyte where the anode comprises particles with a surface comprising at least one carbide compound and a core comprising graphite.

BRIEF DESCRIPTION OF THE DRAWINGS

A more complete understanding of the present invention and benefits thereof may be acquired by referring to the follow description taken in conjunction with the accompanying drawings in which:

FIG. 1 is schematic view of a battery cell in a hypothetical circuit showing the anode, cathode, electrolyte and a circuit.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

First, turning to FIG. 1, a schematic battery is indicated by the arrow 10. The battery includes multiple particles of cathode material 20 and multiple particles of anode material on the opposite side of an electrolyte separator 40. Each of the particles of cathode 20 and anode 30 are held in an electrically conductive paste (not specifically shown) to a respective metal electrode. An electric load, indicated at 50, such as a light or electric motor may be attached to the battery 10 with wiring shown at 51. When battery 10 is charged, positive ions are stored in the anode particles 30.

Due to the electro-chemical natures of the cathode and anode materials, the positive ions are urged (attracted and repelled, respectively) to move from the anode 30 through the electrolyte separator 40 and into the cathode. While the ions move through the electrolyte, electrons pass around through the metal electrode 31 and through the wiring 51 and load 50 to the cathode to balance the electrical charge. The process of passing the electrons through the load causes electrical work to be accomplished such as illuminating a light bulb or turning an electric motor. For lithium-ion batteries, the cathode is generally formed of a lithium bearing chemical structure that forms lithium ions during charging of the battery that transit across the separator 40 and intercalate into the anode. Anode materials are less chemically complex and high performing anode materials may densely store the lithium ions in a manner where they are easily liberated fully back to the cathode without permanent bonding into the anode. This invention focuses on the makeup of the anode material used in batteries like that shown in FIG. 1.

While carbon-coated anode materials have proven to be very attractive properties for high value batteries where low weight and compact size are important, in contrast, there are lower value uses for batteries where weight and size are not as critical. Such lower value uses include fixed location energy storage devices where very high energy capacity is needed such as, for example, standby power for a power distribution grid.

In looking at batteries to meet those needs, studies have been undertaken to develop battery designs that use a larger volume of uncoated, graphitized petroleum coke materials to offset the expected decay of anode performance over multiple cycles of charging and discharging. In the process of exploring optimal graphitization levels for batteries, some graphite nucleating agents were added to accelerate the formation of graphitic structure at lower temperatures. However, the end result was a rather high performing anode material and further developmental work quickly turned to understanding the nature of the new anode product and why it performed at a higher level than expected.

What is believed to have occurred in these tests is that rather than nucleating graphite formation, the nucleating agents have reacted with the carbon surface of the particles forming a carbide compounds or reacted with nitrogen gas to form nitride compounds at the surfaces of the particles. The carbide and nitride compounds do not appear to form deep into the particle thereby preserving the bulk of the particle as crystalline graphite for ion intercalation. The carbides and nitrides apparently protect the graphite structure from the electrolyte in the metal ion batteries thereby preventing the electrolyte from interacting with the graphite. It is commonly known that electrolytes break down the graphite in the anode and yet the small thickness of this modified surface has preserved the graphite sheets in the present invention.

Initial studies began with boron as the nucleating agent. Since graphitizing must be conducted in a non-oxygen environment or the carbon with burn-off principally forming carbon dioxide, graphitizing is typically performed under a non-oxygen blanket gas. Under a nitrogen blanketing gas, nitrides may also be formed on the surface. However, for some nucleating agents, the nitride form may boil off and not remain on the surface. The stable nitrides and/or carbides are best seen to form when the graphitizing temperature is above the melting point of the stable carbide or nitride molecules but below their boiling points. For nucleating agents that form stable nitrides that boil below the graphitizing temperature, other blanketing gases may be chosen that are inert. Argon has been successfully used in those circumstances. Referring to Table 1, potential nucleating agents are shown with representative carbides and nitrides that may be formed during graphitizing. Referring to Table 2, the respective coulombic efficiency and specific capacity are shown for representative batteries made with boron used as a carbide or nitride forming agent.

TABLE 1

| Element | Carbide | Melting Point (° C.) | Boiling Point (° C.) | Nitride | Melting Point (° C.) |
|---------|---------|----------------------|----------------------|---------|----------------------|
| B  | $B_4C$  | 2350 | >3500 | BN           | 2967  |
| Ce | $CeC_2$ | 2250 |       | CeN          |       |
| La | $LaC_2$ |      |       | LaN          |       |
| Mn | $Mn_3C$ | 1520 |       | $Mn_2N_3$, MnN | >1800 |
| Mo | MoC     | 2577 |       | MoN          | 2577  |
|    | $Mo_2C$ | 2687 |       | $Mo_2N$      | 2687  |
| Nb | NbC     | 3608 | 4300  | NbN          | 2050  |
|    | $Nb_2C$ | 3080 |       |              |       |
| Si | SiC     | 2830 |       | $Si_3N4$     | 1900  |
| Ti | TiC     | 3067 |       | TiN          | 2947  |
| V  | VC      | 2810 |       | VN           | 2050  |
|    | $V_2C$  | 2167 |       |              |       |
| Y  | $YC_2$  | 2400 |       | YN           |       |
| Zr | ZrC     | 3532 |       | ZrN          | 2952  |

The carbide and nitride forming materials are blended with the powdered coke at about 0.1 wt % to about 5 wt %. It is believed that the carbides and nitrides form on the surface of the particles as the underlying carbon forms the graphitic structures within. Thus, the inventive process for making the anode powder includes preparing the graphite precursor to the desired size by milling or other known process and adding a suitable amount of the carbide or nitride forming elements by blending together and then subjecting the blended mixture to graphite forming temperature for a time duration sufficient to form the surface chemistry and the underlying graphite structure. For some coke materials, it may be preferred to carbonize them to drive off hetero-atoms and other non-carbon atoms prior to graphitizing by calcining. Carbonizing is typically a heat-treating process that is below graphite temperatures but well elevated such as between 900° C. and 1500° C. and typically in a calciner to increase the carbon content of the coke to at least 92% or a higher content such as 95% or at least 97%.

Preferably, the surfaces of the particles are continuous in either carbides or a mixture of carbides and nitrides leaving no graphite exposed to the electrolyte. It is also preferred that the surface would be preferably smoother versus coarse or jagged to the extent that would be obtainable. Most graphite materials have a jagged surface where the graphite sheets are more prone to fracturing as the particles are sized. A smooth surface is believed to be much more resistant to electrolyte attack on the bulk graphite structure and that is achieved in the prior art by coating. The carbide surface can range from a few atoms thick, resulting in a modified surface that is a few nanometers thick and may be thicker depending on the selected carbide forming compound or compounds, but does not alter the jagged surface to the more desirable smooth surface. The weight content of such a carbide-forming surface or elements in the graphitized powders can range from about 50 ppm up to about 5000 ppm, also depending on the selected compound or compounds.

The types of cokes and carbide-forming compounds were discovered to also play important roles in forming desirable graphite anode materials. The selected cokes are preferably calcined or at least partially calcined at a temperature between 500 and 2000° C. before graphitization. Green cokes, particularly those with high volatile matter may react with the selected carbide-forming compound to form volatile compounds, resulting in evaporation of such elements before forming stable carbide at graphitization temperature. On the other hand, cokes that are carbonized or graphitized at a temperature above 2000° C. are more chemically stable and do not have the chemical reactivity with the selected carbide-forming compounds such as salts and oxides, resulting in evaporation of such added salts or oxides during temperature ramping on graphitization.

The atmosphere under which the mixtures of coke and carbide forming compounds are graphitized is a factor in selecting such carbide forming compounds. Non-oxidizing gases such as argon, helium, and nitrogen are preferred for graphitization. However, in the case of nitrogen gas atmosphere, some carbide-forming elements may also react with nitrogen to form undesirable nitride compounds, particularly those volatile nitride compounds that dilute or diminish carbide contents. Thus, the selection of the carbide-forming compounds is limited to those elements that form high temperature carbides and/or nitrides. For graphitization in argon or other non-reactive gases, the preferred carbide-forming elements form stable carbides at temperatures above 2000° C. In other words, the best results are where the melting point of the resulting carbides is above 2500° C., and preferably above 2700° C.

Moreover, this form of anode material is not coated with a graphite precursor (or carbon layer that is different from the bulk). The invention alters the existing surface to have carbide compounds or carbide and nitride compounds formed on the surface that protects the core of the particles through many charging and discharging cycles. So, without the highly graphitic crystallinity at the surface which is chemically reactive with the electrolyte the nitride or carbide or both at the surface cause the decay of the bulk graphite material to be substantially reduced or eliminated thereby reducing one mode of battery deactivation.

This would suggest that anode material comprising coke whether from petroleum or coal tar could be sized by any of a number of methods to get a mean average particle size so that most of the particles are between about 3 microns and up to about 30 microns which could then be graphitized in an inert atmosphere up to about 3100° C.

Measuring particle size is subject to many viewpoints. In the preferred invention, particle size may be tailored to the battery use or to a battery manufacturer's specifications. Ideally, the particles are substantially similar size considering variabilities of milling, sieving and other sizing technology. And the fact that the particles are not likely to be spherical adds an additional level of complexity. Fortunately, particle size measurement does not need to be complicated. In general, using laser diffraction or imaging systems made by Malvern or Horiba using volume-based calculations provides reasonable accuracy for purposes of providing such anode powders for use in lithium ion batteries. And by these measurements, the mean average particle size within the useful powders are typically between 1 and 50 microns and more typically within a narrower range.

So, this invention provides a new graphite electrode material for lithium-ion batteries and also provides a simpler process for manufacturing such electrode materials. In one embodiment related to the graphite anode materials, the graphite particles contain metal or non-metal carbide and nitride components on particle surfaces, such a carbide or nitride content ranges between 5 ppm and 1% by weight, preferably between 50 ppm and 2000 ppm, but more preferably less than about 1500 ppm and even more preferably between about 100 ppm and about 1000 ppm. The carbide and nitride may be single element or a mixture of different elements. The amount that is blended into with the carbon precursor is between about 500 ppm and 10 weight percent, but more preferably between 1000 ppm and 3 weight percent. The mean average particle size for the anode particles ranges between 3 and 30 microns and preferably between 3 and 25 microns.

The process for producing the graphite materials includes two primary steps: milling graphitizable carbon precursors to specified particle sizes and then graphitizing the resulting powders with the carbide and nitride forming materials at a specific temperature range. In a little more detail, the carbon precursors are selected from petroleum and coal tar cokes. Green cokes are preferred. The selected carbon precursors are milled to a powder having a mean particle size of less than 30 μm, depending on specific battery requirements by any mechanical milling method such as ball-milling, knife-milling, impact-milling, and jet-milling. Typical mean particle sizes range from 3 μm to 25 μm. Optionally, the milled powders are carbonized in a non-oxidizing environment to eliminate non-carbon elements. It should be noted that sizing is preferred before graphitizing as graphitizing makes the particles more brittle yielding more jagged and irregular shaped particles which are more vulnerable to catalytic decomposition of the graphite sheet structures.

The milled powders (carbonized or green) are combined with carbide and nitride forming compounds and graphitized in an inert environment such as nitrogen, argon, helium or combinations thereof at the temperature higher than 2650° C., preferably between 2800° C. and 3000° C. The carbide and nitride forming compounds may be transition metals, non-metals, rare earth metals and combinations thereof. The quantity of the carbide or nitride forming compounds used is between 100 ppm and 10% by weight of the total mass, preferably between 0.05 wt % and 2 wt %.

EXPLANATION OF EXAMPLES

The usefulness of such produced materials is assessed as the negative electrode material (lithium intercalation) in coin cells with lithium metal as the counter electrode. The preparation procedure is described below:

Electrode preparation—Each electrode was fabricated with the following steps: Step 1) About 2 g of the graphitized powder and 0.043 g of carbon black, 0.13 g of polyvinylidene difluoride (PVDF) (in 10 wt % solution (in N-methyl pyrrolidinone (NMP)) were placed in a 25-ml plastic vial and shaken with about 3 g of ⅛" steel balls for 10 min in a mill to form uniform paste. Additional NMP was added to make the mixture more flowable as needed. Step 2) A thin film of the resulting paste was cast on a copper foil or aluminum foil with a doctor-blade coater. The resulting film was dried on a hot plate at 120° C. for at least 2 hours. Step 3) The dried film was trimmed to a 5-cm wide strip and densified through a roller press. Step 4) Three disks (1.5 cm in diameter) of each film were punched out with a die cutter as electrodes. The electrode weight was determined by subtracting the total weight of each disk by the weight of the disk substrate. The electrode composition was 92 wt % graphite, 6 wt % PVDF, and 2 wt % carbon black, and the mass loading was about 10 mg/cm2.

Each coin cell was subjected to electrochemical tests. The coins each consists of bottom can, lithium metal as the counter electrode, separator, disk electrode, stainless steel disk spacer, wave spring, and top can. These components were sequentially placed in the bottom can. The electrolyte was added to the separator before the disk electrode was stacked. An electrolyte of 1 M LiPF6 in 40 vol % ethylene carbonate, 30 vol % dimethyl carbonate, and 30 vol % diethylene carbonate mixture was used. After the top can was dropped onto the stack, the assembly was transferred to the coin cell crimper and crimped together.

The electrochemical tests were performed on an electrochemical test station with the different charge/discharge test programs for negative electrode and positive electrode materials, respectively, as follows:

As negative electrode material for lithium-ion batteries—A) charging at a constant current of −1.0 mA to 0.0 V, B) further charging at 0.0 volt for one hour, C) discharging at 1 mA until the voltage reached 2.0 volt, and D) repeating steps A through C 5 times or for 5 cycles. The electrical charge passed during charging and discharging on each cycle was recorded and used to calculate the specific capacity and coulombic efficiency. All the tests were conducted at ambient temperature and the cells were tested in a glove box where oxygen and moisture levels were below 3 ppm.

Analysis of Carbide and Nitride Forming Element Contents

After graphitization, the powders are dissolved in acid solution and analyzed for the elemental contents by standard inductively coupled plasma mass spectrometry.

Example Set 1

Two petroleum green coke samples were acquired from different sources and dried, crushed, and milled to a mean average particle size of 5 μm. The first sample was from a Phillips 66 refinery in Ponca City, Okla. and the second sample was LXP from a second Phillips 66 refinery in Lake Charles, La. Each of the powders were blended with 1 wt % and 2 wt % elemental boron (<1 μm mean particle size) and compared to a sample of powder without boron. The mixtures were graphitized in argon environment at 2900° C. and were subsequently assessed as a negative electrode material for a lithium-ion battery. For comparison, these anode powders were graphitized under same conditions. Table 2 lists the discharge specific capacities and initial coulombic efficiencies for such graphitized powders. Without boron, the initial coulombic efficiencies are very low (<40%) and the discharge capacities are also low (~300 mAh/g). Such materials are not suitable for use as a negative electrode material for lithium-ion batteries. With boron, the graphitized powders exhibit excellent properties as negative electrode material for lithium-ion batteries (high capacity>350 mAh/g and initial coulombic efficiency>91%).

TABLE 2

| Boron (wt %) | Initial Coulombic Efficiency (%) | | Specific Capacity (mAh/g) | |
|---|---|---|---|---|
| | Coke Sample 1 | Coke Sample 2 | Coke Sample 1 | Coke Sample 2 |
| 0 | 37 | 40 | 298 | 301 |
| 1 | 90.3 | 92.2 | 354.0 | 359.6 |
| 2 | 92.7 | 89.8 | 355.3 | 357.0 |

Example Set 2

Additional coke sample powder of Coke Sample 1 from Example Set 1 was graphitized with several blends of Boron and other carbide and nitride forming elements. Six examples were created each with 1.5 wt % of a blend. The blends comprised boron and cerium at three different ratios of boron to cerium of 1:10, 10:1, and 1:1. These carbide and nitride forming compounds were selected from metal and non-metal chemicals and graphitized in a nitrogen atmosphere at 2900° C. The graphitized powders were evaluated in the same way as those in Example Set 1. Table 3 lists the discharge specific capacities and initial coulombic efficiencies for such graphitized powders. The fourth and fifth columns show the elemental contents of the carbide and nitride forming elements in the powders after graphitization. The first three samples exhibited an initial coulombic efficiency greater than 91% and specific capacity greater than 335 mAh/g, which demonstrates that high performance anode graphite powders can be produced economically according to this invention.

Referring to Table 3 below, it should be quite apparent that at 2900° C. graphitization temperature, the carbide forming element causes a physical difference in the resulting electrode that provides a huge boost to the initial coulombic efficiency. The carbide forming elements have high melting points and seem to cause the carbon at the surface to form carbide crystals or accept (accommodate) nitride crystals at the surface that both allow ions to pass easily in and out of the graphite while at the same time protecting the graphite from the electrolyte.

TABLE 3

| Mixture of Carbide and Nitride forming elements | Specific capacity (mAh/g) | Coulombic efficiency (%) | Boron (ppm) | Cerium (ppm) |
|---|---|---|---|---|
| B and Ce (1:10) | 336.2 | 93.6 | 474 | 248 |
| B and Ce (10:1) | 342.3 | 91.9 | 3060 | 165 |
| B and Ce (1:1) | 340.0 | 94.0 | 185 | 174 |

Example Set 3

A sample of green, anode grade petroleum coke that is typically used in making anodes for aluminum smelting was dried at 100° C., crushed in a roller mill, and pulverized with a laboratory jet mill to a mean average particle size of 5 μm. This sample of coke has a volatile content of 12 weight percent and was divided into six separate samples. The first three samples were blends of boron and cerium and the last three were silicon, manganese and yttrium at about 1.5 weight percent. Each group in separate small crucibles was placed in a large graphite container and graphitized at 2900° C. for 15 minutes in an argon gas environment.

The graphitized powders were evaluated as anode material for lithium-ion batteries in coin cells, as described above. The critical parameters are the specific discharge capacity and initial coulombic efficiency, and the results were listed in Table 4. The contents of the carbide forming elements in the graphitized samples are listed in Table 9. The graphitized samples with a significant content of carbide forming elements yielded an excellent initial coulombic efficiency (>92%) and specific capacity, and those with an undetectable content of carbide forming element showed poor initial coulombic efficiency (<60%) and low specific capacity.

TABLE 4

| Graphite sample | Specific capacity (mAh/g) | Initial Coulombic efficiency (%) |
|---|---|---|
| Example Set 3 | | |
| Boron and Cerium (10:1) | 352.7 | 91.7 |
| Boron and Cerium (1:10) | 339.1 | 93.7 |
| Boron and Cerium (1:1) | 335.8 | 93.7 |
| Silicon | 320.0 | 62.4 |
| Manganese | 323.8 | 66.3 |
| Yttrium | 315.0 | 93.9 |

Example Set 4

The same set of the mixtures as those in Example Set 3 was graphitized in the same way at a temperature of 2900° C. but in a nitrogen gas environment. The resulting graphite powders were evaluated in the same way as Example Set 3. The resulting specific capacities and initial coulombic efficiencies for these samples are listed in Table 5 below. The measured properties are similar to those in Example Set 3 except that yttrium that showed diminished performance in the initial coulombic efficiency. The carbide forming material also forms nitrides with the nitrogen gas that evaporates at a temperature lower than the graphitization temperature and it is believed that the surface treatment did not stay on the particles rendering them unsuitable as anode material in a metal ion battery.

TABLE 5

| Graphite sample | Specific capacity (mAh/g) | Initial Coulombic efficiency (%) |
|---|---|---|
| Example Set 4 | | |
| Boron and Cerium (10:1) | 342.3 | 91.9 |
| Boron and Cerium (1:10) | 340.0 | 94.0 |
| Boron and Cerium (1:1) | 336.2 | 93.6 |
| Silicon | 319.1 | 56.9 |
| Manganese | 322.1 | 57.2 |
| Yttrium | 308.0 | 54.1 |

These examples show that the graphitized powders with the presence of carbide-forming elements exhibit excellent properties as anode material for lithium-ion batteries, the ones without a content of such carbide-forming element do not have the desirable property (low coulombic efficiency).

Example Set 5

For the Set 5 of the Examples, three grades of green petroleum coke were dried at 100° C., crushed in a roller mill, and pulverized with a laboratory jet mill to a mean average particle size of 5, 8, 11 and 15 μm, respectively. The resulting coke powders were heated in nitrogen gas at 950° C. for two hours to remove the volatile matter. These coke powders are labeled as A, B, and C in the examples described below where A is an aluminum anode grade petroleum coke, B is a premium petroleum coke of the type that is used for anodes in electric arc furnaces for making recycled steel, and C is a lower grade premium petroleum coke which has been used as a precursor for making anodes in metal ion batteries having elevated volatile content.

A sample of various coke particles are blended including 11 μm powder of coke A, 5 and 8 μm powders of coke B, and a 15 μm powder of coke C along with two carbide-forming compounds (element boron and cerium oxide) with the weight content of 0.5% and 1.5%. The resulting mixtures were graphitized under the same conditions as Example Set 4 and tested as anode material for lithium-ion batteries. The graphitized samples are labeled as A5, B5, B8, and C15, respectively in this example. The test results were listed in Table 6 below.

TABLE 6

| Graphite sample | Specific capacity (mAh/g) | Initial Coulombic efficiency (%) |
|---|---|---|
| Example Set 5 | | |
| A11 | 348.2 | 94.4 |
| B5 | 355.7 | 92.7 |
| B8 | 356.2 | 93.6 |
| C15 | 356.3 | 94.6 |

Comparative Example Set 1

The 5 μm powder of coke A and the 5 and 8-micrometer powders of coke B were graphitized in nitrogen gas environment without any carbide forming elements under the same condition as Example Set 4. The graphitized powders were evaluated as anode material for lithium-ion batteries in the same way as the above examples. These samples were labeled as A5, B5, and B8, respectively in this example. The test results are also listed in Table 7 under Comparative Example 1 below.

TABLE 7

| Graphite sample | Specific capacity (mAh/g) | Initial Coulombic efficiency (%) |
|---|---|---|
| Comparative Example Set 1 | | |
| A5 | 313.9 | 53.6 |
| B5 | 312.5 | 41.7 |
| B8 | 309.9 | 38.2 |

Comparative Example Set 2

The 5 and 8 micrometer powders of coke B were coated with 8 wt % and 6 wt % pitch using the solution phase precipitation method as described in U.S. Pat. No. 7,323,120. The pitch coating process involves several steps including a) dispersing the coke powder in an organic solvent, b) dissolving the selected pitch in the organic solvent, c) heating both the coke and pitch solution to an elevated temperature, d) mixing the two solutions and cooling the mixture under continuous agitation so that a certain heavy portion of the dissolved pitch precipitates out as solid film on coke particles, e) separating the pitch-coated coke particles from the solution by filtration, f) washing out the residual pitch solution on the coated coke particles using extra organic solvent and finally drying the pitch-coated particles. The pitch-coated powders were further processed by oxidation in air at an elevated temperature (below 350° C.) so that the resulting particles become infusible and the coated pitch becomes less graphitizable than the bulk coke core. This process is typically named as stabilization. After pitch-coating and stabilization, the powders were graphitized under the same condition as Example Set 4. The graphitized powders were evaluated as anode material for lithium-ion batteries in the same way as before and the results are posted in Table 8 under Comparative Example 2 below.

TABLE 8

| Graphite sample | Specific capacity (mAh/g) | Initial Coulombic efficiency (%) |
|---|---|---|
| Comparative Example 2 | | |
| B5 | 325.4 | 95.0 |
| B8 | 328.7 | 95.4 |

The Sample Sets 3 and 4 were subjected to analytical testing to determine its constituents after graphitization. The amounts of carbide and nitride forming elements in the anode material after testing are shown in in Table 9. Not all elements could be measured considering the intrinsically low levels and the capabilities of inhouse testing equipment.

TABLE 9

| Graphite sample | Element content (ppm) | | | | |
|---|---|---|---|---|---|
| | B | Ce | Mn | Si | Y |
| Example Set 3 | | | | | |
| A | 1670 | 14.6 | below detectable level (BDL) | Not tested | Not tested |
| B | 493 | 3060 | | | |
| C | 320 | 248 | | | |
| D | 63.5 | BDL | | | |
| E | 72.9 | | | | |
| F | 12.2 | | | | |
| Example Set 4 | | | | | |
| A | 3060 | 165 | below detectable level (BDL) | Not tested | Not tested |
| B | 185 | 174 | | | |
| C | 474 | 248 | | | |
| D | 79.8 | BDL | | | |
| E | 51.1 | | | | |
| F | 8.36 | | | | |

In Sample Set 5, an anode sample was made with 8 μm premium coke by graphitizing in nitrogen gas at 2900 and for fifteen minutes in a nitrogen environment, with a combination of Boron and another Carbide or Nitride forming element at a ratio 1:3. The weights are measured before graphitization. The results are shown in Table 10.

TABLE 10

| Carbide Element | Specific capacity (mAh/g) | Initial Coulombic efficiency (%) |
|---|---|---|
| Example Set 5 | | |
| B and Ce (0.5%, 1.5% by wt) | 348.9 | 92.5 |
| B and La (0.5%, 1.5% by wt) | 343.9 | 92.6 |
| B and Mo (0.5%, 1.5% by wt) | 332.5 | 93.1 |
| B and Nb (0.5%, 1.5% by wt) | 332.6 | 92.5 |
| B and Ti (0.5%, 1.5% by wt) | 349.2 | 93.4 |
| B and F (0.5%, 1.5% by wt) | 334.4 | 92.1 |

The above examples demonstrate that the graphite powders produced according to this invention exhibit superior specific capacity and excellent initial coulombic efficiency compared to those made through the state-of-art processes and that the process is simple and the resulting graphite powders have different chemical compositions on either particle surface or bulk from those made with prior art processes.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A lithium-ion battery comprising:
a cathode;
an anode; and
an electrolyte;
wherein the anode comprises particles with a surface comprising at least one carbide compound and a core comprising graphite
wherein the carbide compound includes a carbide forming element of B and Ce.

2. The lithium-ion battery according to claim 1 wherein the carbide compound comprises from about 50 ppm up to about 1% by weight of the anode particles.

3. The lithium-ion battery according to claim 1 wherein the carbide compound includes a carbide forming element selected from Ti, Y, Zr, Nb, Mo, La, and combinations thereof.

4. The lithium-ion battery according to claim 1 where in the anode has an initial coulombic efficiency of greater than 85% and a specific capacity of greater than 325 mAh/g.

5. The lithium-ion battery according to claim 1 where in the anode has an initial coulombic efficiency of greater than 88% and a specific capacity of greater than 345 mAh/g.

6. The lithium-ion battery according to claim 1 wherein the anode particles comprise both carbide and nitride.

7. The lithium-ion battery according to claim 6 wherein the carbide and nitride includes a forming element selected from Ti, Y, Zr, Nb, Mo, La, Ce, B, and combinations thereof.

8. The lithium-ion battery according to claim 6 wherein the carbide and nitride together comprise from about 50 ppm up to about 1% by weight of the anode particles.

9. The lithium-ion battery according to claim 8 wherein the anode has an initial coulombic efficiency of greater than 85% and a specific capacity of greater than 325 mAh/g.

10. The lithium-ion battery according to claim 9 wherein the anode has an initial coulombic efficiency of greater than 88% and a specific capacity of greater than 345 mAh/g.

11. The lithium-ion battery according to claim 6 wherein the carbide and nitride compounds together comprise between 5 ppm and 2000 ppm by weight of the anode.

12. The lithium-ion battery according to claim 11 wherein the carbide and nitride compounds together comprise between 50 ppm and 1500 ppm by weight of the anode.

13. The lithium-ion battery according to claim 12 wherein the carbide and nitride compounds together comprise between 100 ppm and 1000 ppm by weight of the anode.

\* \* \* \* \*